Oct. 18, 1966  W. V. PETERNELL ETAL  3,278,991
DIP COATING APPARATUS
Filed July 2, 1965  8 Sheets-Sheet 1
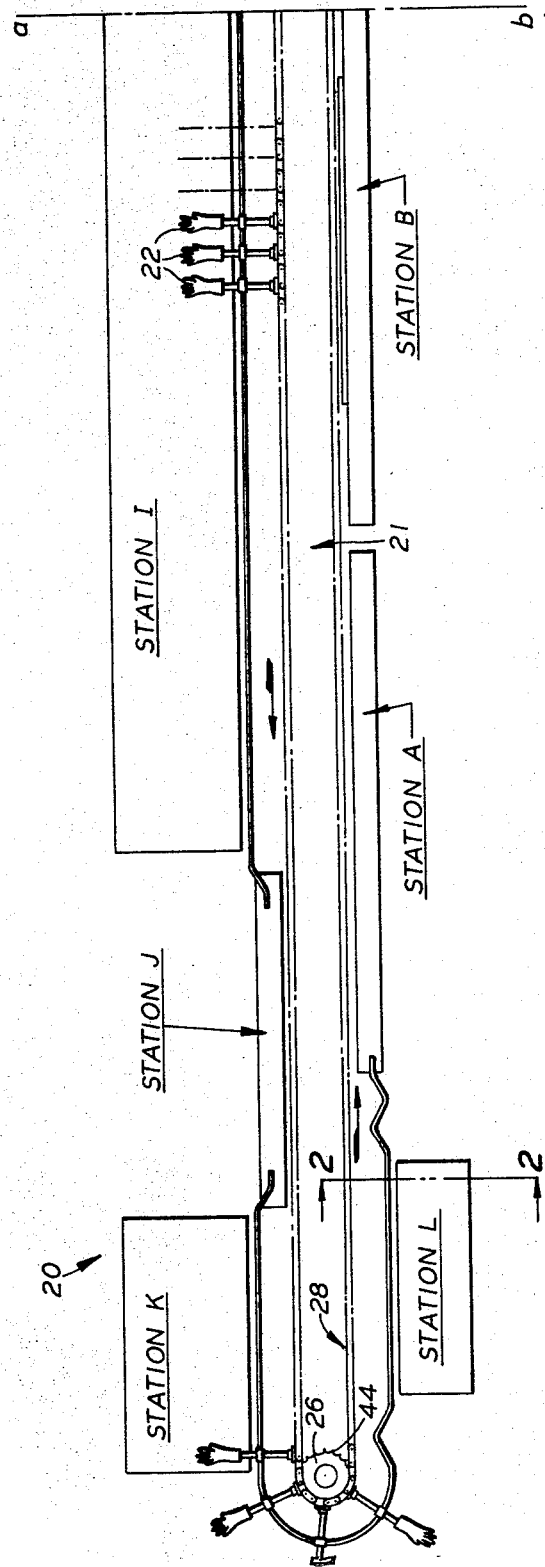
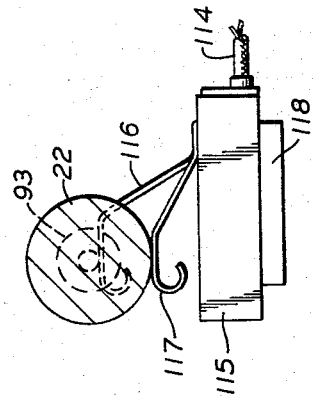
INVENTORS
WALTER V. PETERNELL
GEORGE D. RITCHIE
BY
Hamilton & Cook
ATTORNEYS

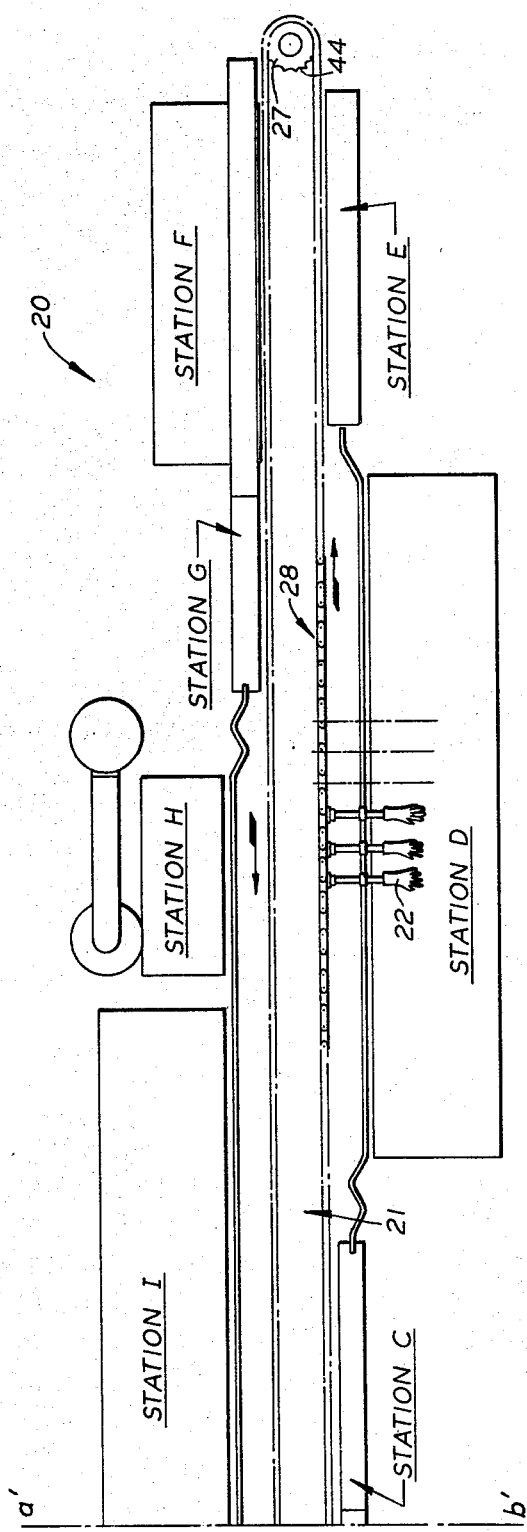
FIG. IA
INVENTORS
WALTER V. PETERNELL
GEORGE D. RITCHIE
BY
Hamilton & Cook
ATTORNEYS INVENTORS
WALTER V. PETERNELL
GEORGE D. RITCHIE
BY Hamilton & Cook
ATTORNEYS INVENTORS
WALTER V. PETERNELL
GEORGE D. RITCHIE
BY Hamilton & Cook
ATTORNEYS

INVENTORS
WALTER V. PETERNELL
GEORGE D. RITCHIE
BY
ATTORNEYS

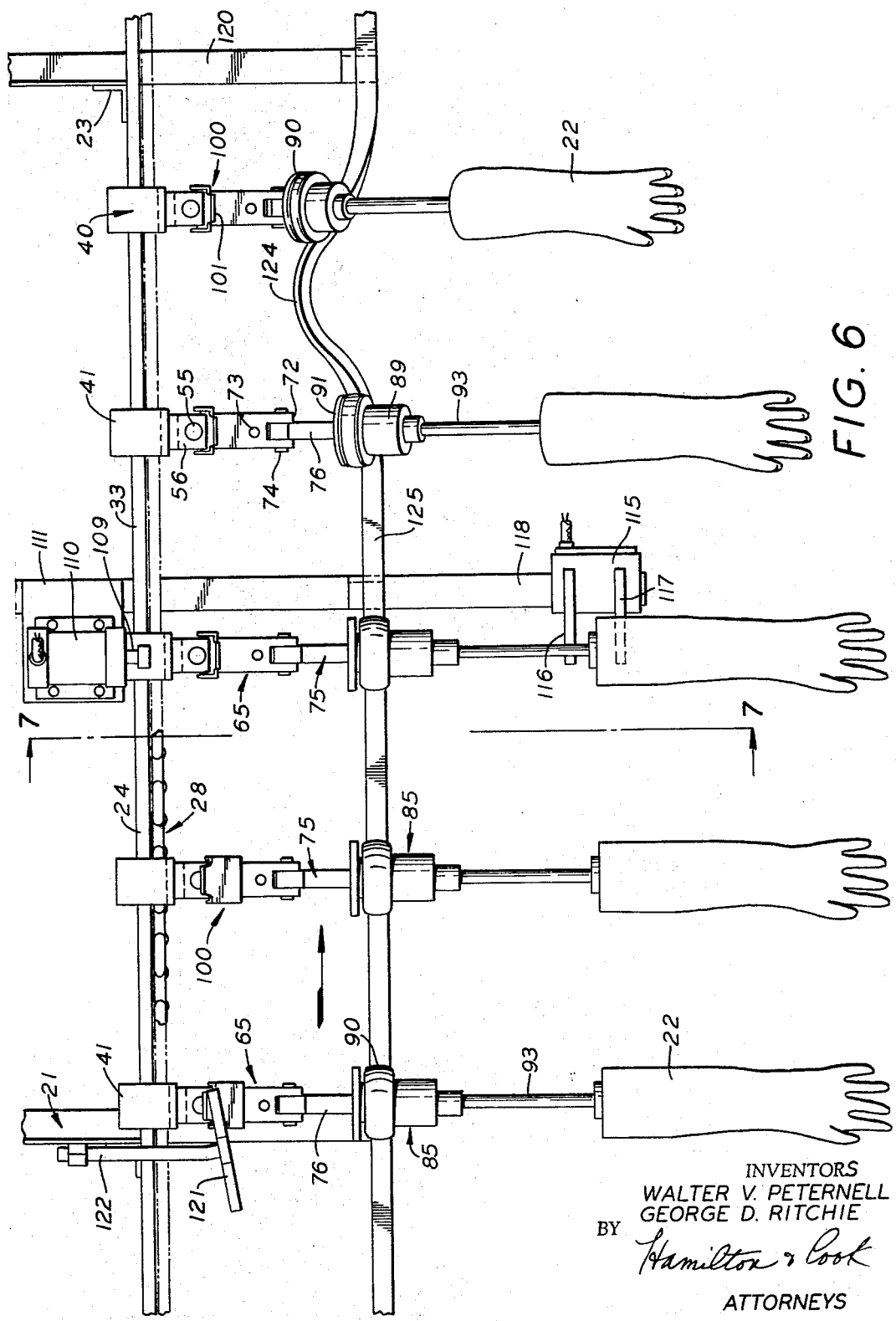

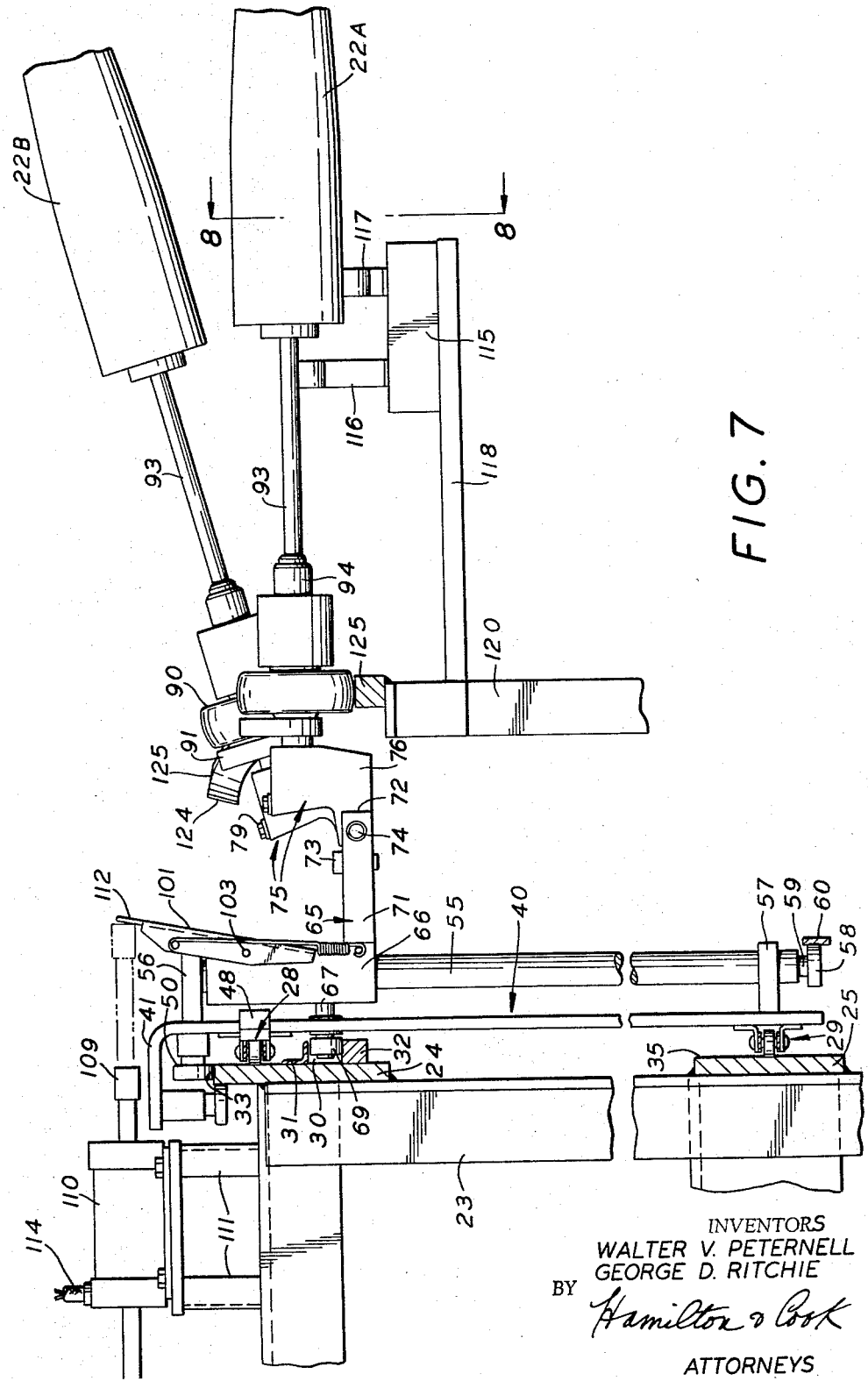

United States Patent Office 3,278,991
Patented Oct. 18, 1966

3,278,991
DIP COATING APPARATUS
Walter V. Peternell and George Douglas Ritchie, Akron, Ohio, assignors to McNeil Corporation, Akron, Ohio, a corporation of Ohio
Filed July 2, 1965, Ser. No. 469,245
9 Claims. (Cl. 18—24)

The present invention relates to apparatus for dip coating mandrels to form articles thereon. More particularly, the invention relates to improvements in apparatus for continuously conveying a large number of specially shaped mandrels or cores through a series of operations, including dip coating or immersion casting in a tank or bath of plastic, latex or rubber-like material, to make commercially saleable products. Specifically, apparatus constructed according to the preferred embodiment of the invention as disclosed and described herein is used for the making of flexible gloves from solutions or dispersions of vinyl resin.

The principal object of the present invention is to provide structure for the more efficient preparation and dipping of mandrels, and for the curing and treating of articles formed on the mandrels during a dip coating process. It is a specific object of the invention to provide for controlled and precise sequential movement of a large number of mandrels through a dip coating installation occupying a minimum of floor or factory space. It is a further object of the invention to provide mechanisms permitting all necessary operations, as are required for the particular dip coating material or plastic being used, to be performed in a technically satisfactory or proper sequence. These and other objects of the invention, as well as the several advantages and improved results attributable to the structure disclosed herein, will be apparent in view of the attached drawings and the detailed description which follows.

In the drawings:

FIG. 1 is a top plan schematic view of an installation of dip coating apparatus according to the invention showing the product delivery or left hand end thereof and to be considered in conjunction with FIG. 1a;

FIG. 1a is a top plan schematic view showing the right hand end of the apparatus installation and to be considered in conjunction with FIG. 1;

FIG. 6 is a fragmentary top plan schematic view showing the continuously moving product forming mandrels after product delivery (Station L) and prior to beginning (Station A) of the product forming operations;

FIG. 7 is an enlarged sectional view, taken substantially as indicated on line 7—7 of FIG. 6; and FIG. 8 is a view, taken substantially as indicated on line 8—8 of FIG. 7, showing details of an electrical mechanism for determining the condition of each mandrel prior to the first product forming operation.

Figure 3:
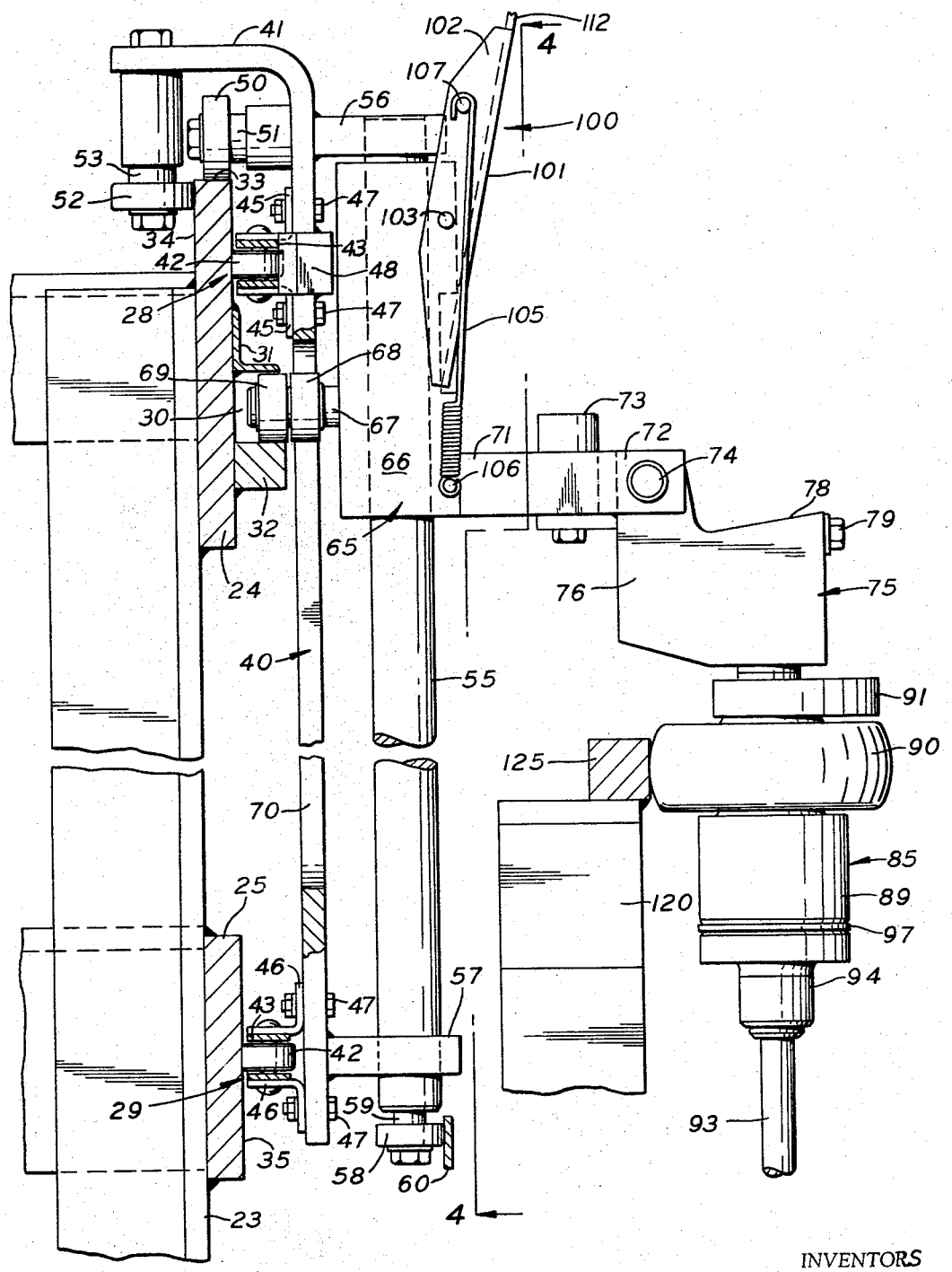
FIG. 3 is a view, similar to FIG. 2, illustrating the apparatus frame and conveyor, and the carriage, support, attachment, rotating and latch structures for the mandrels.

An installation of dip coating apparatus according to the invention is indicated generally by the numeral 20. A conveyor, indicated generally by the numeral 21, which has longitudinally moving drive elements thereon travels to and through, or past, a series of stations to perform the various operations as are required for the particular dip coating material being used. For the installation 20 described herein, the coating material is a solution or dispersion of vinyl resin. The product is a flexible glove for household or utility use formed on suitably shaped, in this case "right hand" and "left hand," mandrels or cores 22.

The conveyor of installation 20 has a series of circumferential drive elements movable longitudinally thereon. A carriage for each mandrel is attached to the drive elements laterally of the conveyor. A support for each mandrel is movable vertically of each carriage. An attachment structure for each mandrel is carried by each support. A mounting shaft for each mandrel extends away from each attachment structure. Each mandrel attachment structure may also be provided with a safety latch preventing a mandrel from re-entering the sequence of the dip coating operations if the mandrel is not in proper condition.

Along the outside of conveyor 21 are the various operating stations. At Station A the mandrels 22 are brought to a suitable standard temperature as by immersion in a tank of heated water. At Station B the "tempered" mandrels are gradually immersed and withdrawn, and are optionally rotated, into and out of a bath or tank containing the vinyl resin solution to form the outer layer of the glove product. At Station C the "coated" mandrels are pased over a pan or table, and are optionally inverted and rotated, to drain excess coating material from the mandrel.

At Station D, the coated mandrels enter an oven heated to a temperature sufficient to progressively gel and then fuse the vinyl resin. At Station E, the "cured" mandrels are cooled, as by immersion in a water tank or by air blast, to a suitable standard temperature below the gelation temperature of the coating material.

As the conveyor 21 makes its return, the mandrels 22 are again gradually immersed and withdrawn into and out of a coating bath at Station F. The coating material at Station F forms the inner layer of the glove product being formed on the mandrels 22. At Station G the "second coated" mandrels are passed over a drain table to catch excess coating material.

At Station H, the second coated mandrels may be subjected to a flock spray, of finely chopped fabric bits, which will adhere to the coating material to form a lining in the glove product.

At Station I, the mandrels enter a second oven heated to a temperature to progressively gel and then fuse the second layer of vinyl resin or coating material, with the flock material as applied at Station H becoming integrally bonded thereto.

At station J, the cured mandrels are cooled, as by immersion in a tank of water. At Station K, the products on the mandrel are thoroughly dried for removal at Station L.

At Station L, the products is stripped from each mandrel 22 either manually or by suitable mechanical devices (not shown).

The conveyor 21 includes a long narrow frame including a series of floor mounted vertical stanchion elements 23 which are interconnected by horizontal track elements 24 and 25. At each end of the frame are vertically mounted power driven rotatable members, 26 and 27, for moving continuous drive elements indicated generally by the numerals 28 and 29 longitudinally around the conveyor frame circumferentially of the track elements 24 and 25.

Referring to FIG. 3, an upper horizontal track 24 is attached, as by welding, to a vertical stanchion 23. The outer side surface of a track 24 has a guide channel 30 defined by a top flange rail 31 and a track block 32. The upper edge of a track 24 has a guide surface 33. The upper inner side of a track 24 has a guide surface 34.

The lower horizontal track 25 is also attached, as by welding, to the vertical stanchions 23. The outer side of a track 25 has a guide surface 35.

Each mandrel 22 has a carriage indicated generally by the numeral 40 moved by the upper and lower conveyor drive elements, 28 and 29, laterally and outwardly around the frame of the conveyor 21. The primary structural component of each mandrel carriage 40 is a vertically oriented dorsal plate 41, preferably having the shape, in cross-section, of an inverted "J."

Figure 4:
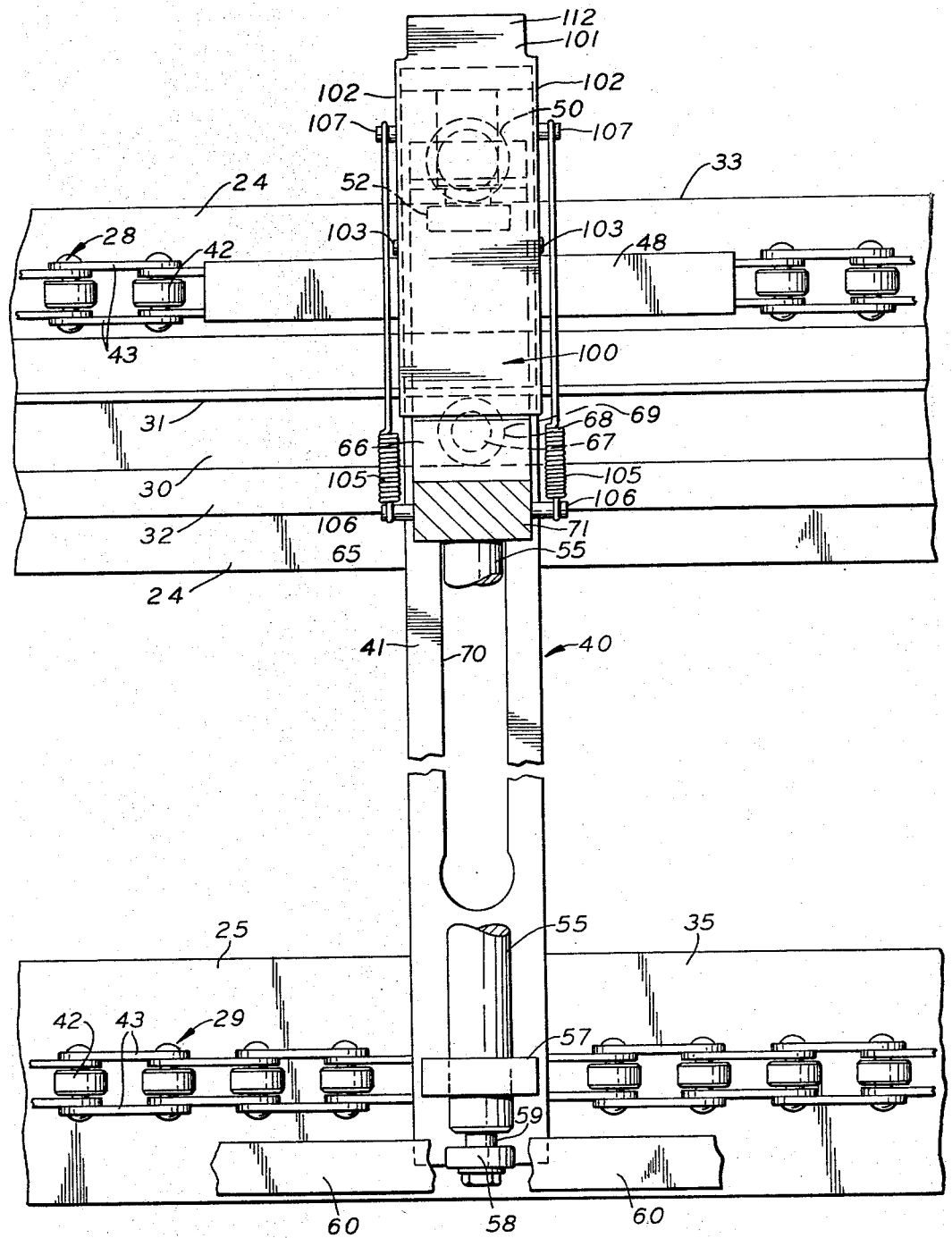
FIG. 4 is a sectional view, taken substantially as indicated on line 4—4 of FIG. 3, showing further details of the apparatus.

As shown, the conveyor drive elements 28 and 29 each consist of a chain having interconnected rollers 42 and closed links 43 engaging the sprocket teeth 44 of the drive members 26 and 27 (see FIG. 1 and FIG. 1a). The chain links 43 are connected to each dorsal plate 41 by an upper clevis 45 and a lower clevis 46, mounted on the plate as by bolts 47. During horizontal movement of the chains 28 and 29, the rollers 42 may ride against the outer side surface of a track 24 above the guide channel 30 and against the guide surface 35 of a track 25. As best shown in FIG. 4, outwardly of clevis 45 connecting the upper chain 28 to the carriage, each dorsal plate 41 carries a laterally extending plate 48 for longitudinally stabilizing the mandrel carriage 40 during movement around the installation 20.

As best shown in FIG. 3, each mandrel carriage 40 is supported for movement on the conveyor frame from a vertical roller 50 riding on the guide surface 33 of an upper track 24. Each roller 50 rotates on an axle 51 extending horizontally inward from near the upper end of a plate 41.

Each mandrel carriage 40 is transversely stabilized during movement around the conveyor frame by a horizontal roller 52 riding against the guide surface 34 of an upper track 24. Each roller 52 rotates on an axle 53 extending vertically downward from the inwardly projecting upper end of a plate 41.

To provide an axis for vertical movement of each mandrel 22 as required while at the several operating stations, each mandrel carriage has a slide rod 55. Referring to FIG. 3, each slide rod 55 is mounted between outwardly extending upper and lower brackets, 56 and 57, attached to the outer face of a dorsal plate 41.

As described above, each mandrel carriage 40 is transversely stabilized during movement around the conveyor frame by a horizontal roller 52. If desired, each carriage 40 may be further stabilized by a horizontal roller 58 rotating on an axle 59 extending from the end of a slide rod 55 below a bracket 57. Each roller 58 may engage, as required, the inner surface of an auxiliary guide member 60 which may be suitably attached to the frame of conveyor 21 at desired locations.

Each mandrel 22 is mounted on or carried by a mandrel support indicated generally by the numeral 65. Each mandrel support 65 has an inner block 66 with a vertical bore for movable mounting on a mandrel carriage slide rod 55. A support block 66 has an inwardly extending axle 67 for tandem horizontal mounting of a plate roller 68 and a guide channel roller 69. The inner roller 69 rides in the frame guide channel 30 between the rail 31 and track block 32 to provide for vertical movement of the support block 66 on the carriage rod 55.

As best shown in FIG. 4, the middle roller 68 rides in a vertical guide way 70 formed in the dorsal plate 41 to stabilize the support block 66 and to guide or define the extreme, upward and downward, extent of vertical movement for the mandrel support 65 while at the several operating stations.

Referring to FIG. 3, each block 66 carries adjacent the lower end an outwardly extending lateral leg 71 terminating in a clevis end 72. Between the end 72 and block 66, the upper surface of a leg 71 has attached thereon a resilient bumper block 73. Extending between the clevis ends 72 is a securely attached horizontal pin 74.

Figure 5:
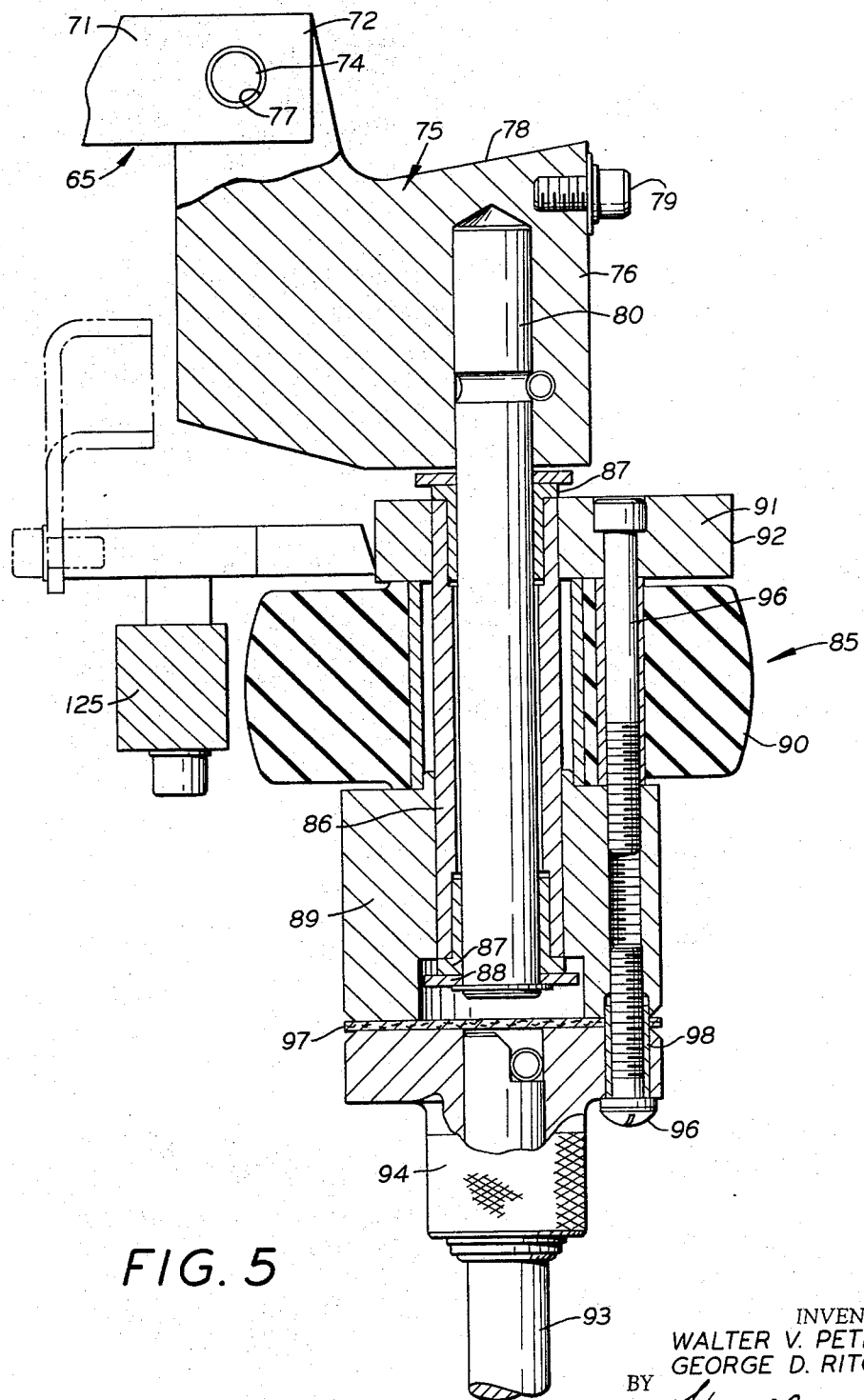
FIG. 5 is an enlarged side elevational view, broken away, showing details of the mandrel support and attachment structures.

Each mandrel 22 is attached to the mandrel support 65 by a mandrel attachment structure indicated generally by the numeral 75. As best shown in FIG. 5, the attachment structure 75 has a base member 76 which is generally "hatchet-shaped" in cross-section with the shaft portion having a horizontal bore 77 for rotatable mounting on a support block pin 74.

The interior surface of member 76 has a relieved corner and a surface 78 for contact with the resilient bumper 73 on a mandrel support 65.

The blade surface of member 76 has a button or catch element 79 for selective and locking engagement with a mandrel safety latch structure as described in detail below.

The exterior surface of member 76 has a bore therein receiving the base end of a spindle rod 80 for carrying each mandrel 22 and the mandrel rotation and axial orientation structure 85.

Each mandrel 22 is rotatably mounted on the spindle rod 80 of the mandrel attachment structure 75 by a mandrel rotation and orientation structure indicated generally by the numeral 85. As best shown in FIG. 5, a cylindrical sleeve 86 having end bushings 87 is rotatably journaled on the attachment rod 80 and secured thereon by a washer and lock unit 88.

The outer end of a sleeve 86 is inserted within and secured to the hub portion 89 of a chuck unit for carrying each mandrel 22.

The medial portion of a sleeve 86 securely mounts a "wheel-shaped" caster 90 for selective engagement with a drive rail structure on the apparatus frame at predetermined locations and as described in detail below.

The inner end of a sleeve 86, adjacent the attachment base member 76, preferably is inserted through and secured to an eccentric cam member 91 having one or more surfaces 92 specially shaped to axially orient the mandrels at predetermined positions along the apparatus conveyor 21 and as described in detail below.

Each mandrel 22 is carried at the end of an outboard shaft or rod 93 extending away from the attachment structure 75 and having any desired length, as determined by the operations to be performed at the several stations along the apparatus installation 20. The inner end of a shaft 93 is removably inserted within an adjustable jaw structure 94.

The caster 90, the chuck portions 89 and 94, and the optional orientation cam 91, are assembled together by a series of long threaded bolts 96 inserted therethrough.

The chuck portions 89 and 94 are electrically insulated one from the other by a sheet 97 and sleeves 98 of suitable dielectric insulating material, for a purpose described in detail below in connection with FIG. 8.

The products formed on each mandrel 22 should be removed at completion of the dip coating operational sequence. As shown in FIG. 1, this operation is performed at Station L. In the event that the dip coated product (e.g., the vinyl resin gloves) are not removed from a mandrel 22, a safety latch structure 100 will prevent that particular mandrel from re-entering the sequence of the dip coating operations.

Figure 2:
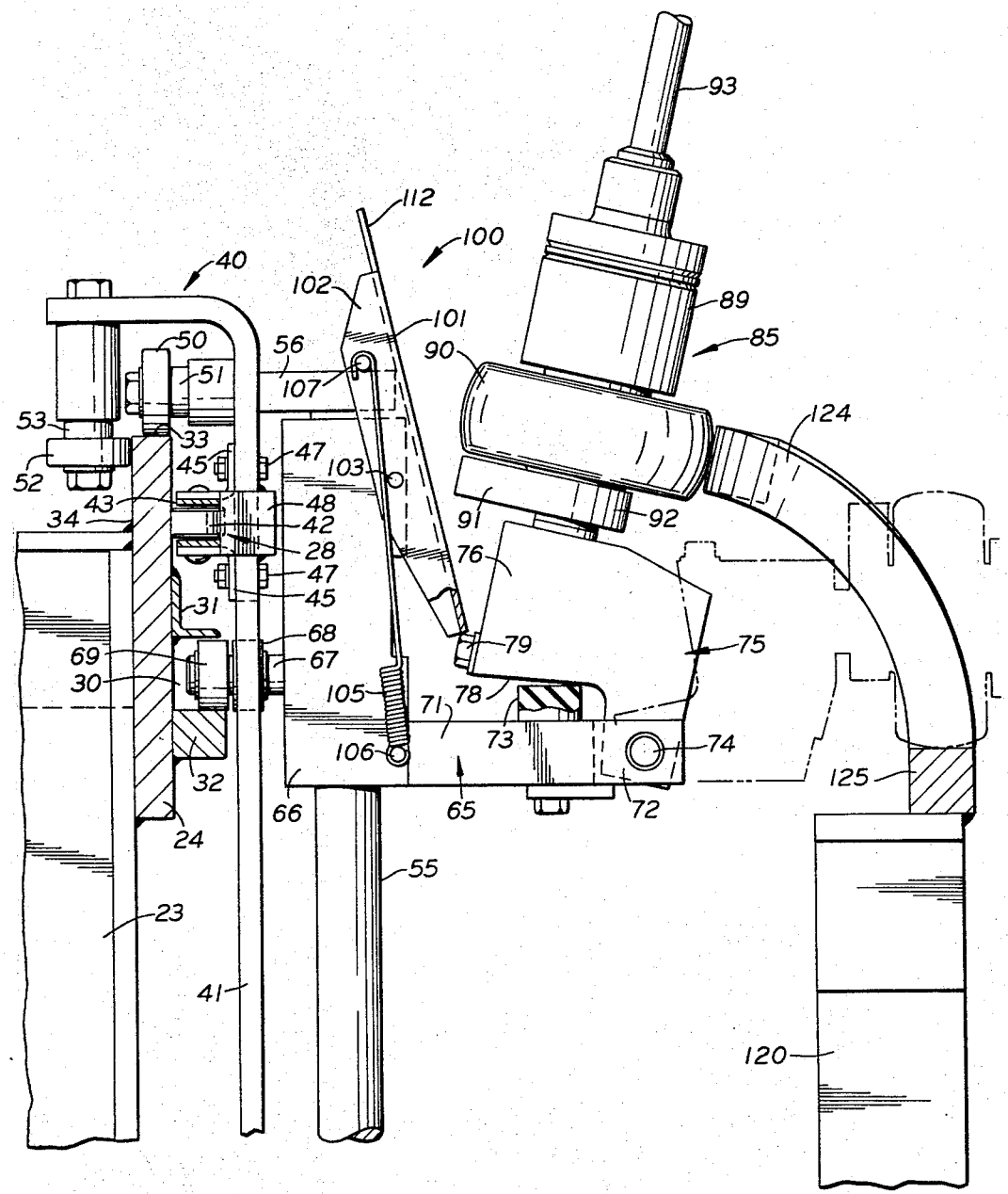
FIG. 2 is an enlarged sectional view, taken substantially as indicated on line 2—2 of FIG. 1, illustrating two alternative operating positions for the product forming mandrels of the apparatus installation.

Each mandrel attachment structure 65 may be provided with a safety latch structure indicated generally by the numeral 100. As best shown in FIG. 2, when operative the latch 100 is engaging the button or catch element 79 on the blade surface of attachment element 76 to maintain the mandrel rod 93 in a substantially vertical, upright or "passive" position.

The safety latch structure 100 includes a rectangular plate 101 having a lower edge selectively engaging the attachment button 79. The plate has inwardly directed side flanges 102 for engaging a mounting pin 103 extending horizontally from either side of the upper outer portion of the mandrel attachment support block 66. The pin 103 provides a medial pivot for movement of the latch plate 101 relative to the support block 66.

In FIG. 2, the latch plate 101 is shown as engaging the button 79 on attachment element 76. The latch plate 101 is biased or urged to maintain this active position or condition by the tensive force exerted by spring means 105. As shown, for each mandrel 22 there are a pair of coiled springs 105 having a coiled portion connected to the lower outer portion of the mandrel attachment support block 66 by a pin 106. The free end of each spring 105 is connected to a pin 107 on each plate side flange 102 above the pivot pin 103.

In FIG. 7 (and in FIG. 3), the latch structure 100 is shown as out of engagement with the mandrel attachment structure 75, permitting of normal operative movement of the mandrels 22 as determined by the operations to be performed at the several stations along the apparatus installation. The latch plate 101 is selectively moved to this inactive position or condition by the laterally and outwardly extending plunger 109 of a cylinder or actuator means 110. The plunger actuator means 110 is mounted on the frame of conveyor 21 by a suitable bracket 111 so that the plunger 109, when laterally extended, will cause the upper portion 112 of the latch plate 101 to move outwardly about the pivot pin 103. The actuator means 110 is energized by an electrical signal conducted through cable 114 from a switch mechanism 115.

As shown, referring to FIGS. 7 and 8, each mandrel safety latch structure 100 is selectively moved by the actuator means 110 to an inactive position under the control of an electrical switch mechanism 115 or safety means to detect and confirm that each mandrel 22 is in condition to re-enter the cycle or sequence of dip coating operations. Electrical switch 115 is a suitably energized element having two spring leaf contactors, 116 and 117. The switch 115 is mounted on a shelf bracket 118 extending laterally from a conveyor frame member 120 so that contactor 116 will make contact with the mandrel rod 93 and contactor 117 will make contact with a product forming portion of each mandrel 22.

A dip coated product formed on a mandrel 22 is electrically insulative. If the product has not been removed at Station L, no current will pass between the contactors 116 and 117 and no electrical signal will pass from the switch mechanism 115, through cable 114, to energize the plunger actuator means 110.

Referring to FIG. 6, the latch plate of each safety latch structure 100 is set for the position of engaging the catch button 79 on the blade surface of the mandrel attachment element 76 by a pressure plate 121 mounted on a bracket 122 extending laterally from a frame member of the conveyor 21. The inner surface of the plate 121 is oriented toward the conveyor so that an approaching latch plate (in the condition of FIG. 3) will be set into the condition so that the lower edge of plate 101 will engage the catch button 79 (see FIG. 2). If the mandrel condition is correct, the plunger actuator means 110 is energized, as described above, to restore the latch structure for a normal operative position of the mandrel.

Referring to FIGS. 2 and 6, each mandrel attachment structure 75 is moved to a substantially vertical position, ready for engagement by the safety latch structure 100, by an upwardly and inwardly directed surface 124 of a drive rail 125 engaging the caster 90 of a mandrel rotation and orientation structure 85. The drive rail 125 is carried, as by the frame structure 120, and extends longitudinally of the apparatus 20 at the several operating stations to impart such rotation to the mandrels 22 as may be desired. For example, when the drive rail 125 is in the location shown in FIG. 3, the mandrels will rotate in a vertically downward position (as at Station B). In FIG. 7, the front mandrel (22A) is rotating in a horizontal position (as at Station L) and the back mandrel (22B) is beginning to be raised for engagement with the safety latch structure 100.

What is claimed is:

1. Apparatus for dip coating mandrels to form articles thereon, comprising, a conveyor having longitudinally moving drive elements thereon, a carriage for each mandrel attached to said drive elements laterally of said conveyor, a support for each mandrel movable vertically of each carriage, an attachment structure for each mandrel carried by each support, and a shaft extending away from each attachment structure carrying each mandrel.

2. Apparatus for dip coating mandrels to form articles thereon, comprising, a conveyor having longitudinally moving drive elements thereon, a carriage for each mandrel attached to said drive elements laterally of said conveyor, said carriage having a vertically oriented dorsal plate, a support for each mandrel movable vertically of each carriage, said support having a guide engaging said dorsal plate, an attachment structure for each mandrel carried by each support, and a shaft extending away from each attachment structure carrying each mandrel.

3. Apparatus for dip coating mandrels to form articles thereon, comprising, a conveyor having longitudinally moving drive elements thereon, a carriage for each mandrel attached to said drive elements laterally of said conveyor, a support for each mandrel movable vertically of each carriage, an attachment structure for each mandrel carried by each support, a shaft extending away from each attachment structure carrying each mandrel, a safety latch structure on each attachment structure for maintaining said shaft in a substantially vertical position, and means for selectively moving said safety latch structure to an inactive condition.

4. Apparatus for dip coating mandrels to form articles thereon, comprising, a conveyor having a long narrow frame, circumferentially extending drive elements movable longitudinally of said frame, a carriage for each mandrel attached to said drive elements laterally of said conveyor, a support for each mandrel movable vertically of each carriage a guide channel on said frame to provide for vertical movement of said support, an attachment structure for each mandrel carried by each support, and a shaft extending away from each attachment structure carrying each mandrel.

5. Apparatus for dip coating mandrels to form articles thereon, comprising, a conveyor having a long narrow frame including a series of floor mounted stanchion elements interconnected by horizontal track elements, vertically mounted power driven rotatable members at each end of said frame, continuous drive elements moved by said rotatable members longitudinally around said frame circumferentially of said track elements, a carriage for each mandrel attached to said drive elements and supported for movement on said frame by said horizontal track elements, a support for each mandrel movable vertically of each carriage, a guide channel on said track elements to provide for vertical movement of said support, an attachment structure for each mandrel carried by each support, and a shaft extending away from each attachment structure carrying each mandrel.

6. Apparatus for dip coating mandrels to form articles thereon, comprising, a conveyor having a long narrow frame including a series of vertical stanchion elements interconnected by horizontal track elements, continuous drive elements movable longitudinally around said frame circumferentially of said track elements, each mandrel having a carriage including a vertically oriented dorsal plate attached to said drive elements, each said dorsal plate having rollers on the upper end thereof contacting the upper portion of a horizontal track element and supporting the carriage for movement on said frame, each said dorsal plate further having a vertical slide rod on the outer face thereof, a support for each mandrel movably mounted on each said slide rod, an attachment structure for each mandrel carried by each support, and a shaft extending away from each attachment structure carrying each mandrel.

7. Apparatus for dip coating mandrels to form articles thereon, comprising, a conveyor having longitudinally moving drive elements thereon, a carriage for each mandrel attached to said drive elements laterally of said conveyor, each said carriage having a vertical slide rod on the outer face thereof and a vertical guide way, a support for each mandrel including a block with a bore for movable mounting on a carriage slide rod, each said block having inwardly extending rollers engaging a carriage guide way and an outwardly extending lateral leg, an attachment structure for each mandrel carried by said lateral leg of each support block, and a shaft extending away from each attachment structure carrying each mandrel.

8. Apparatus for dip coating mandrels to form articles thereon, comprising, a conveyor having longitudinally moving drive elements thereon, a carriage for each mandrel attached to said drive elements laterally of said conveyor, a support for each mandrel movable vertically of each carriage and having an outwardly extending lateral leg, an attachment structure for each mandrel including a base member rotatably mounted on a lateral leg of a support, and a shaft extending away from each base member carrying each mandrel.

9. Apparatus for dip coating mandrels to form articles thereon, comprising, a conveyor having a long narrow frame, circumferentially extending drive elements movable longitudinally of said frame, a carriage for each mandrel attached to said drive elements laterally of said conveyor, a support for each mandrel movable vertically of each carriage, a guide channel on said frame to provide for vertical movement of said support, an attachment structure for each mandrel carried by each support, a spindle rod extending away from each attachment structure, a mandrel rotatably mounted on each spindle rod, and a drive rail structure on said frame for rotating said mandrel.

References Cited by the Examiner
UNITED STATES PATENTS

| | | | |
|---|---|---|---|
| 1,656,977 | 1/1928 | Henry | 118—425 X |
| 1,906,444 | 5/1933 | Bixby | 18—24 |
| 2,297,663 | 9/1942 | Strassman | 18—24 X |
| 2,299,269 | 10/1942 | Gammeter | 18—24 X |
| 2,482,418 | 9/1949 | Jenkins | 18—24 X |
| 2,609,094 | 9/1952 | Fry. | |
| 2,704,993 | 3/1955 | Davis | 118—425 X |
| 3,013,302 | 12/1961 | Croxton | 18—24 X |

WILLIAM J. STEPHENSON, *Primary Examiner.*